(12) United States Patent
Ikeda et al.

(10) Patent No.: US 12,272,489 B2
(45) Date of Patent: Apr. 8, 2025

(54) ELECTRONIC DEVICE

(71) Applicant: SHINDENGEN ELECTRIC MANUFACTURING CO., LTD., Tokyo (JP)

(72) Inventors: Kosuke Ikeda, Saitama (JP); Yoshiaki Hiruma, Saitama (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 759 days.

(21) Appl. No.: 17/255,954

(22) PCT Filed: Jun. 29, 2018

(86) PCT No.: PCT/JP2018/024765
§ 371 (c)(1),
(2) Date: Dec. 23, 2020

(87) PCT Pub. No.: WO2020/003482
PCT Pub. Date: Jan. 2, 2020

(65) Prior Publication Data
US 2021/0272748 A1  Sep. 2, 2021

(51) Int. Cl.
*H01F 27/32* (2006.01)
(52) U.S. Cl.
CPC .................. *H01F 27/327* (2013.01)
(58) Field of Classification Search
CPC ..... H01F 27/327; H01F 27/22; H01F 27/2876
(Continued)

(56) References Cited

U.S. PATENT DOCUMENTS 6,181,231 B1 * 1/2001 Bartilson ............. H01F 27/323
  336/200
7,969,002 B2 * 6/2011 Ashrafzadeh ........... H01F 17/04
  257/E23.079
(Continued)

FOREIGN PATENT DOCUMENTS

CN      103366935 A   * 10/2013
EP      2924451 A1  *  9/2015  ............... G01R 1/04
(Continued)

OTHER PUBLICATIONS

Extended European Search Report from EP app. No. 18924681.2, dated Jan. 24, 2022, all pages.
(Continued)

*Primary Examiner* — Mang Tin Bik Lian
*Assistant Examiner* — Joselito S. Baisa
(74) *Attorney, Agent, or Firm* — Ladas & Parry, LLP

(57) ABSTRACT

An electronic device has a primary coil 10; a secondary coil 20 disposed to face the primary coil 10; a coil sealing part 50 sealing the primary coil 10 and the secondary coil 20 and being made of sealing resin; a primary-side electronic element 110 electrically connected to the primary coil 10; and a secondary-side electronic element 210 electrically connected to the secondary coil 20. The primary-side electronic element 110 is provided on a primary-side extension part 60 extending from the primary coil 10 to an outside of the coil sealing part 50, or the secondary-side electronic element 210 is provided on a secondary-side extension part 70 extending from the secondary coil 20 to an outside of the coil sealing part 50.

8 Claims, 17 Drawing Sheets

(58) Field of Classification Search
USPC .................................. 336/222, 220, 232
See application file for complete search history.

(56) References Cited

U.S. PATENT DOCUMENTS

| | | | | |
|---|---|---|---|---|
| 8,675,368 B2* | 3/2014 | Cho | ........................ | H01L 28/40 |
| | | | | 361/777 |
| 10,405,429 B2* | 9/2019 | Ando | .................... | H05K 1/165 |
| 2003/0127704 A1* | 7/2003 | Kobayashi | ............ | H01L 23/552 |
| | | | | 257/E23.114 |
| 2007/0152795 A1* | 7/2007 | Zeng | .................. | H01F 27/2804 |
| | | | | 336/212 |
| 2007/0176726 A1* | 8/2007 | Xu | .......................... | H01F 37/00 |
| | | | | 336/229 |
| 2009/0196973 A1* | 8/2009 | Piatko | .................... | A23L 27/30 |
| | | | | 426/570 |
| 2009/0309684 A1* | 12/2009 | Tsai | ...................... | H01F 27/325 |
| | | | | 336/105 |
| 2009/0322447 A1* | 12/2009 | Daley | ................ | H01L 23/5223 |
| | | | | 257/E29.001 |
| 2010/0301987 A1* | 12/2010 | Belot | ...................... | H01F 19/04 |
| | | | | 336/222 |
| 2011/0254649 A1* | 10/2011 | Hollevoet | ........... | H01F 27/2852 |
| | | | | 336/200 |
| 2014/0027891 A1 | 1/2014 | Kimura et al. | | |
| 2018/0330870 A1 | 11/2018 | Sakai et al. | | |
| 2020/0258675 A1* | 8/2020 | Jimenez Pino | ....... | H01F 27/306 |

FOREIGN PATENT DOCUMENTS

| | | | |
|---|---|---|---|
| JP | H05283247 A | | 10/1993 |
| JP | 2002165453 A | | 6/2002 |
| JP | 4123768 B2 | * | 7/2008 |
| JP | 2009212141 A | | 9/2009 |
| JP | 2010123898 A | * | 6/2010 |
| JP | 2012231616 A | | 11/2012 |
| JP | 2014056868 A | | 3/2014 |
| JP | 2015159174 A | | 9/2015 |
| JP | 2017037946 A | | 2/2017 |
| WO | WO-2012014250 A1 * | 2/2012 | ......... H01F 27/2852 |
| WO | 2017/13117 A1 | | 8/2017 |

OTHER PUBLICATIONS

Office Action for Japanese Patent Application 2020-526843 issued on Mar. 22, 2022.
International Search Report in the international application No. PCT/JP2018/024765, mailed on Aug. 7, 2018.
Written Opinion of the International Searching Authority in the international application No. PCT/JP2018/024765, mailed on Aug. 7, 2018 and English translation provided by Google Translate.

* cited by examiner

ELECTRONIC DEVICE

CROSS-REFERENCE TO RELATED APPLICATION

The present application is the U.S. national phase of PCT Application No. PCT/JP2018/024765 filed on Jun. 29, 2018, the disclosure of which is incorporated herein by reference in its entirety.

TECHNICAL FIELD

The present invention relates to an electronic device that has a primary coil and a secondary coil.

BACKGROUND ART

Conventionally, in an electronic device that has a primary coil and a secondary coil, an insulating sheet has been generally provided between wiring lines that constitute each of the coils, in order to maintain electrical insulation in each of the coils. However, in a case where such an insulating sheet is provided, a space is inevitably formed between insulating sheets, and therefore there is a problem of a reduction in thermal conductivity. JP 2014-56868 A has proposed that heat dissipation is secured by using resin having satisfactory thermal conductivity. However, from the viewpoint of heat dissipation, this cannot be said to be sufficient yet.

Furthermore, conventionally, it has been proposed that a coil is sealed with resin, as disclosed in JP 05-283247. However, it has been only proposed that one coil is simply sealed with resin.

Furthermore, conventionally, in a DC-CD converter, a primary-side mode, a transformer, and a secondary-side module are independent of each other, and due to constraints on a size of the transformer or a positional relationship of the transformer, a wring length between respective modules increases, and a size increases.

SUMMARY OF INVENTION

Problem to be Solved by Invention

The present invention provides an aspect that enables an increase in thermal conductivity and enhancement of heat dissipation, and enables a reduction in wiring length and a reduction in size in an electronic device that has a primary coil and a secondary coil.

Means for Solving Problem

[Concept 1]
An electronic device may comprise:
a primary coil;
a secondary coil disposed to face the primary coil;
a coil sealing part sealing the primary coil and the secondary coil and being made of sealing resin;
a primary-side electronic element electrically connected to the primary coil; and
a secondary-side electronic element electrically connected to the secondary coil, wherein
the primary-side electronic element may be provided on a primary-side extension part extending from the primary coil to an outside of the coil sealing part, or the secondary-side electronic element may be provided on a secondary-side extension part extending from the secondary coil to an outside of the coil sealing part.

[Concept 2]
In the electronic device according to concept 1,
the primary-side electronic element may be provided on the primary-side extension part extending from the primary coil to the outside of the coil sealing part, and
the secondary-side electronic element may be provided on the secondary-side extension part extending from the secondary coil to the outside of the coil sealing part.

[Concept 3]
In the electronic device according to concept 1 or 2,
the primary-side electronic element may have a primary-side first electronic element, a primary-side connecting body provided on the primary-side first electronic element, and a primary-side second electronic element provided on the primary-side connecting body.

[Concept 4]
In the electronic device according to any one of concepts 1 to 3,
the secondary-side electronic element may have a secondary-side first electronic element, a secondary-side connecting body provided on the secondary-side first electronic element, and a secondary-side second electronic element provided on the secondary-side connecting body.

[Concept 5]
In the electronic device according to any one of concepts 1 to 4,
the primary coil may have a first coil and a second coil coupled to the first coil.

[Concept 6]
In the electronic device according to concept 5,
the primary coil may be made from a lead frame.

[Concept 7]
In the electronic device according to any one of concepts 1 to 6,
the primary-side electronic element may be provided on the primary-side extension part extending from the primary coil to the outside of the coil sealing part, and
a first bent part may be provided between the coil sealing part and the primary-side electronic element, and in the primary-side extension part.

[Concept 8]
In the electronic device according to any one of concepts 1 to 7,
the secondary-side electronic element may be provided on the secondary-side extension part extending from the secondary coil to the outside of the coil sealing part,
a second bent part may be provided between the coil sealing part and the secondary-side electronic element, and in the secondary-side extension part.

[Concept 9]
In the electronic device according to any one of concepts 1 to 8,
the primary-side electronic element may be provided on the primary-side extension part extending from the primary coil to the outside of the coil sealing part, and
a first bent part may be provided between the coil sealing part and the primary-side electronic element, and in the primary-side extension part,
the secondary-side electronic element may be provided on the secondary-side extension part extending from the secondary coil to the outside of the coil sealing part,
a second bent part may be provided between the coil sealing part and the secondary-side electronic element, and in the secondary-side extension part, a primary-side sealing part sealing the primary-side electronic element may be provided, a secondary-side sealing part sealing the secondary-side electronic element may be provided, and a back surface of the coil sealing part, a back surface of the primary-side sealing part, and a back surface of the secondary-side sealing part may be able to abut onto a cooling body.

Effect of Invention

As an aspect of the present invention, in a case where an aspect in which the primary-side electronic element is provided on the primary-side extension part extending from the primary coil to an outside of the coil sealing part; or the secondary-side electronic element is provided on the secondary-side extension part extending from the secondary coil to the outside of the coil sealing part has been employed, wiring length can be reduced, and a size can be reduced.

As an aspect of the present invention, in a case where an aspect in which the coil sealing part sealing the primary coil and the secondary coil and being made of sealing resin is provided has been employed, an insulating sheet that has been conventionally used does not need to be provided, and as a result, a space that is inevitably formed between insulating sheets can be eliminated. Therefore, thermal conductivity can be increased, and heat dissipation can be enhanced.

EMBODIMENT OF INVENTION

First Embodiment

<<Configuration>>

Figure 5:
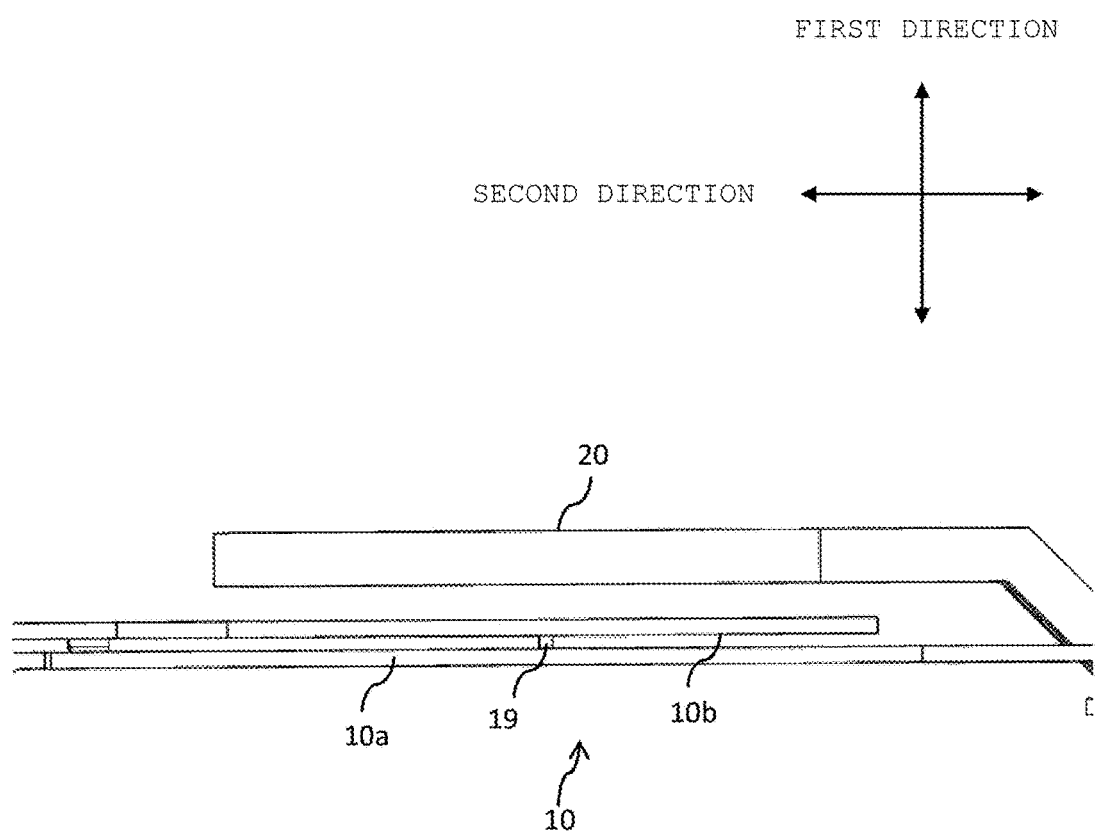
FIG. 5 is a side view illustrating the primary coil and the secondary coil that can be used in the first embodiment of the present invention.

In the present embodiment, "one side" means an upper side in FIG. 5, and "another side" means a lower side in FIG. 5. An upward or downward direction in FIG. 5 is referred to as a "first direction", a leftward or rightward direction is referred to as a "second direction", and directions of front and reverse sides of paper are referred to as a "third direction". An in-plane direction including the second direction and the third direction is referred to as a "plane direction", and it is referred as a "plan view" when viewed from the one side.

Figure 1:
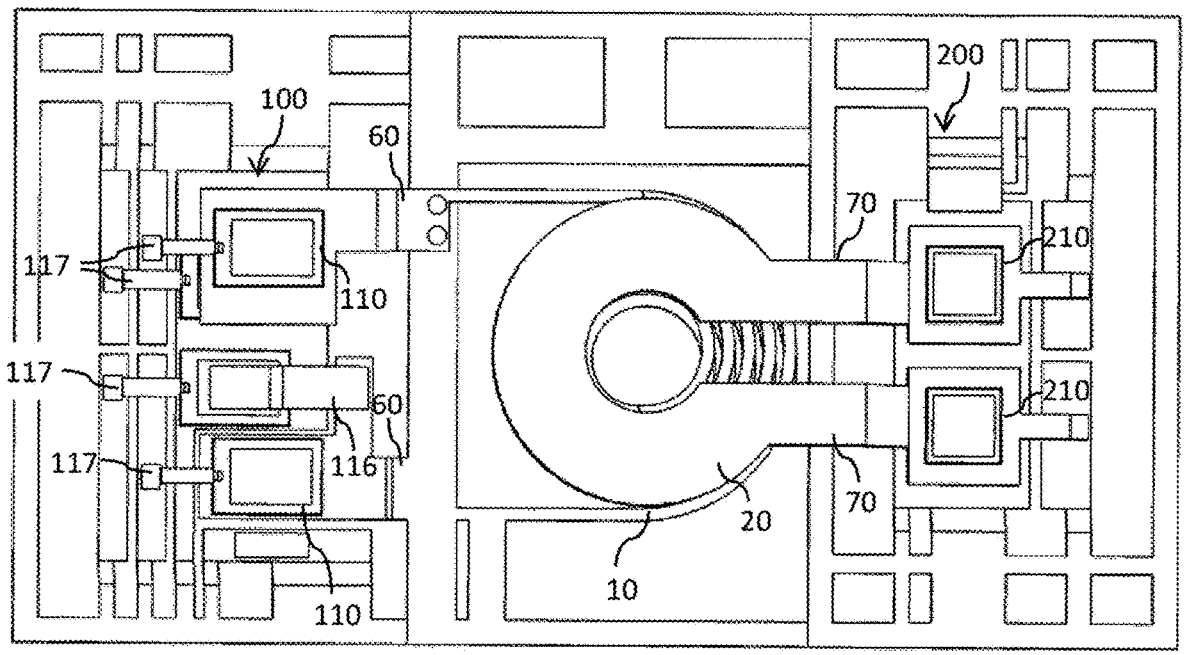
FIG. 1 is a plan view illustrating a state before an electronic device that can be used in a first embodiment of the present invention is separated from a lead frame.
Figure 1:
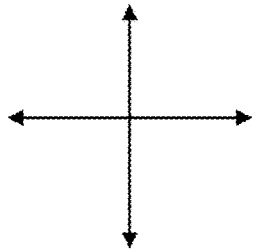
Figure 2:
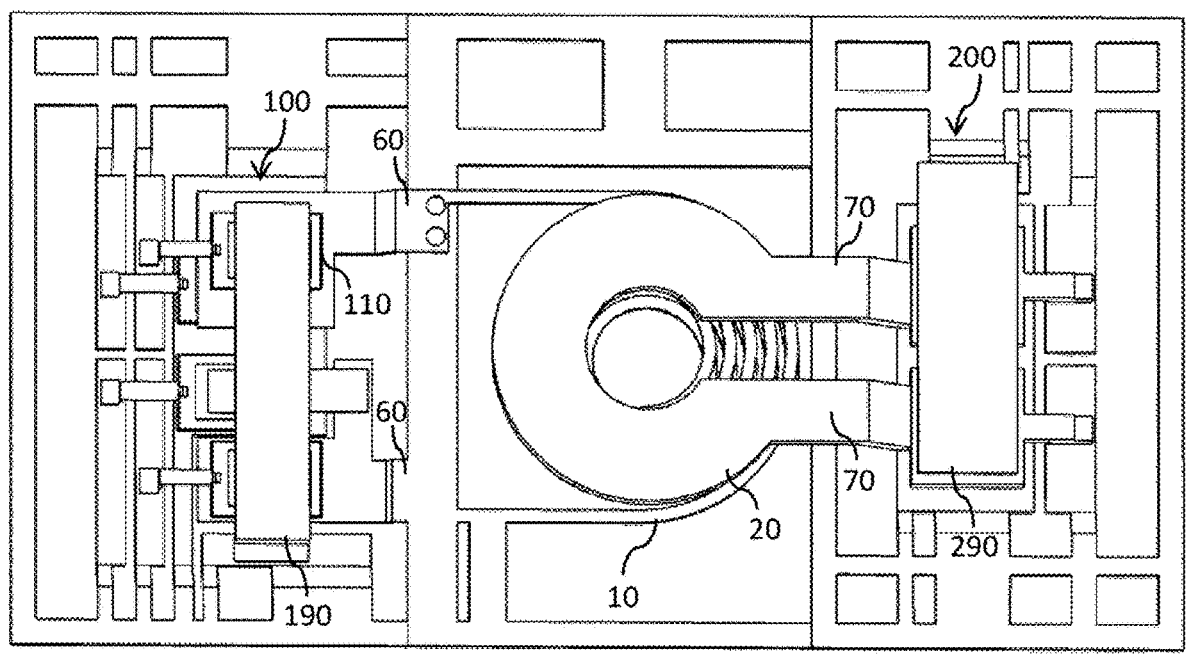
FIG. 2 is a plan view illustrating a state before the electronic device that can be used in the first embodiment of the present invention is separated from the lead frame, and is a plan view illustrating an aspect in which a primary-side connecting body and a secondary-side connecting body are provided.

As illustrated in FIG. 1, an electronic device according to the present embodiment may have a primary coil 10, a secondary coil 20 disposed to face the primary coil 10, a coil sealing part 50 (see FIG. 3) sealing the primary coil 10 and the secondary coil 20 and being made of sealing resin, a primary-side electronic element 110 electrically connected to the primary coil 10, and a secondary-side electronic element 210 electrically connected to the secondary coil 20. The primary coil 10 may be constituted of a lead frame. A thickness of the secondary coil 20 may be greater than a thickness of the primary coil 10.

Figure 4:
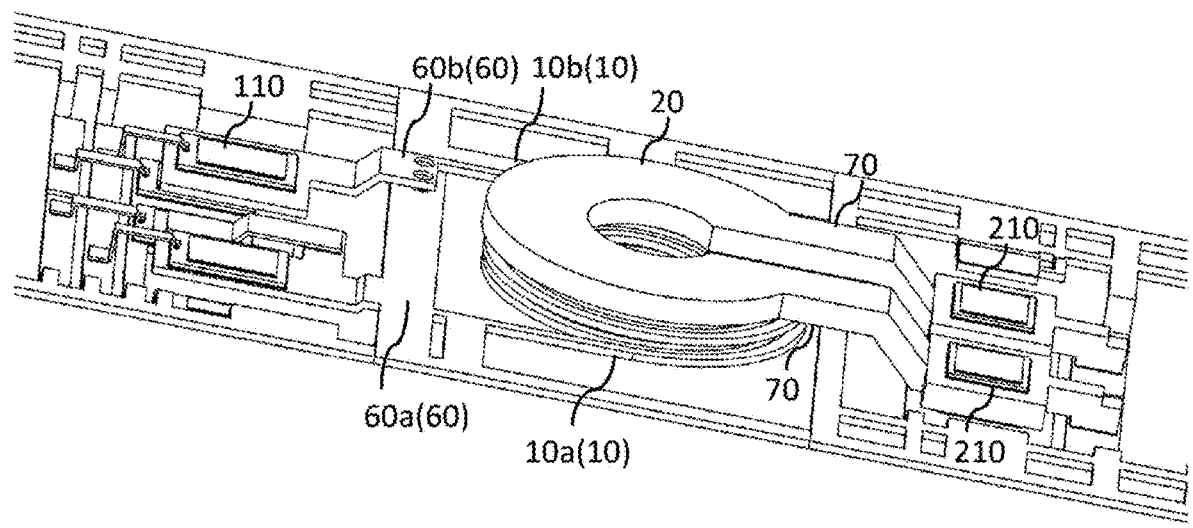
FIG. 4 is a perspective view illustrating a primary coil, a secondary coil, and the like that can be used in the first embodiment of the present invention.

As illustrated in FIG. 4, the primary-side electronic element 110 may be provided on a primary-side extension part 60 that extends from the primary coil 10 to an outside of the coil sealing part 50. The secondary-side electronic element 210 may be provided on a secondary-side extension part 70 that extends from the secondary coil 20 to the outside of the coil sealing part 50.

Figure 3:
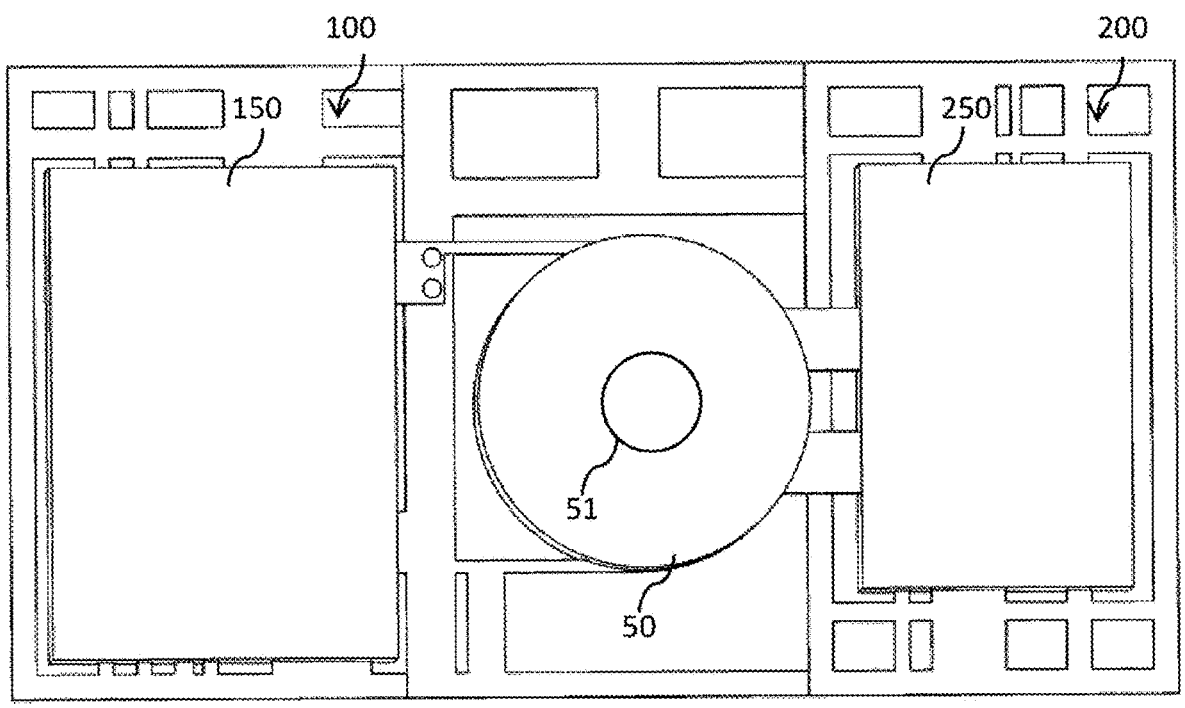
FIG. 3 is a plan view that illustrates a coil sealing part, a primary-side sealing part, and a secondary-side sealing part that can be used in the first embodiment of the present invention, and corresponds to FIG. 1.

As illustrated in FIG. 3, the primary-side electronic element 110 may be sealed with a primary-side sealing part 150. The primary-side sealing part 150 may be constituted of primary-side sealing resin. The secondary-side electronic element 210 may be sealed with a secondary-side sealing part 250. The secondary-side sealing part 250 may be constituted of secondary-side sealing resin. The primary-side sealing resin and the secondary-side sealing resin may be constituted of the same resin material, or may be constituted of resin materials that are different from each other.

Figure 6:
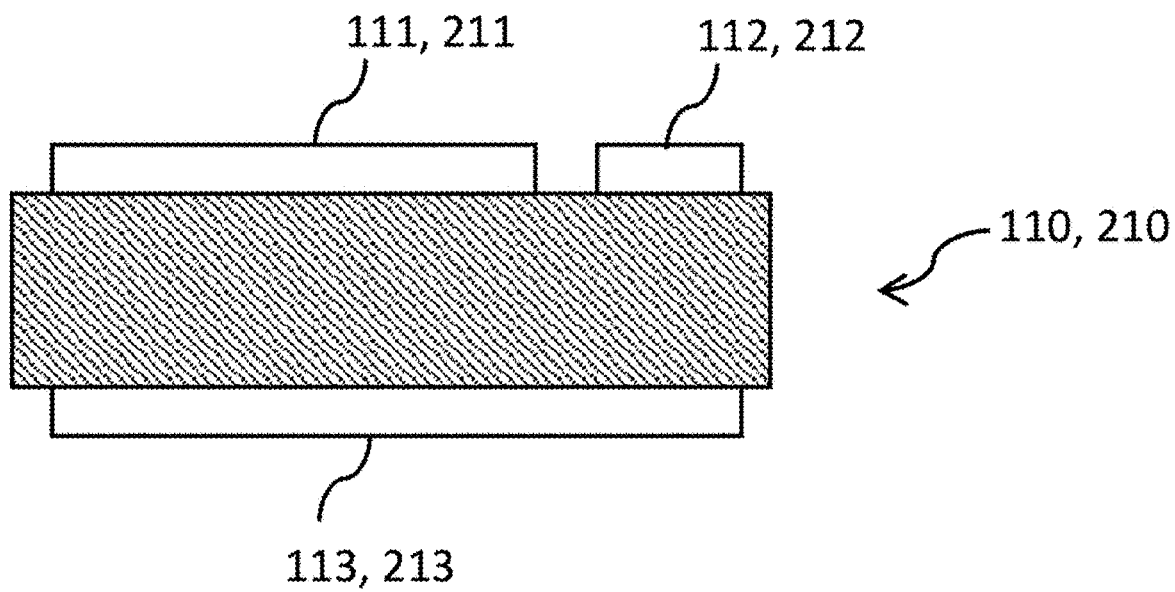
FIG. 6 is a side sectional view illustrating a primary-side electronic element and a secondary-side electronic element that can be used in the first embodiment of the present invention.

As illustrated in FIG. 6, a primary-side first electrode (for example, a source electrode) 111 and a primary-side second electrode (for example, a gate electrode) 112 may be provided on one surface of the primary-side electronic element 110, and a primary-side third electrode (for example, a drain electrode) 113 may be provided on another surface of the primary-side electronic element 110. The primary-side first electrode 111 and the primary-side conductor layer 130 may be connected via a primary-side first connector 116 (see FIG. 1) and a conductive adhesive (not illustrated) such as solder. The primary-side second electrode 112 and the primary-side conductor layer 130 may be connected via a primary-side second connector 117 (see FIG. 1) and a conductive adhesive such as solder. The primary-side third electrode 113 and the primary-side conductor layer 130 may be connected via a conductive adhesive such as solder. Furthermore, as illustrated in FIG. 7, the primary-side first electrode 111 may be provided on one surface of the primary-side electronic element 110, and the primary-side second electrode 112 may be provided on another surface of the primary-side electronic element 110.

Figure 7:
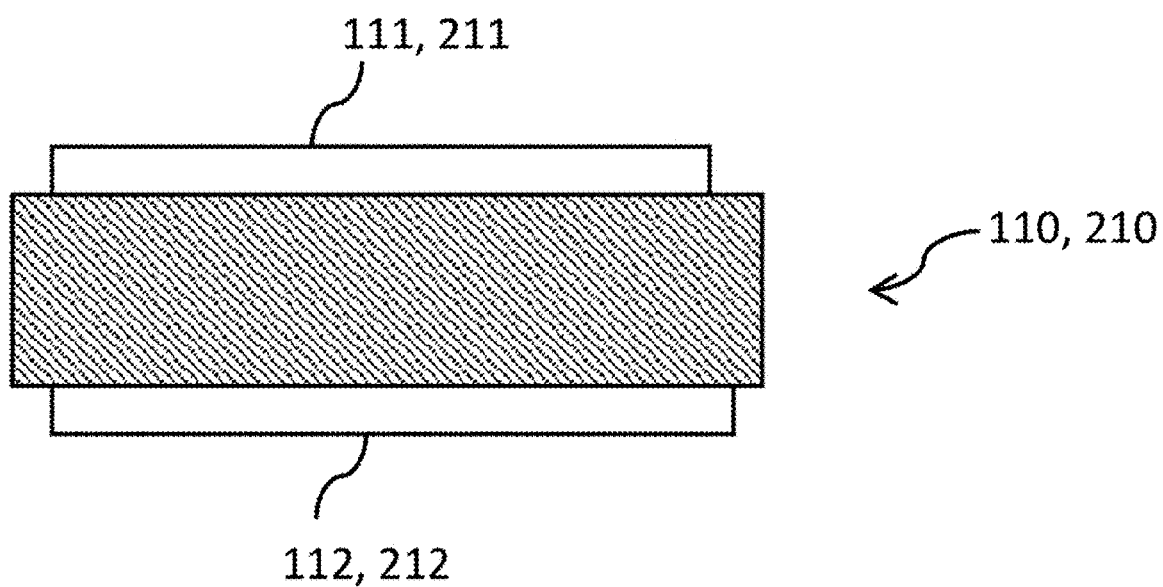
FIG. 7 is a side sectional view illustrating another aspect of the primary-side electronic element and the secondary-side electronic element that can be used in the first embodiment of the present invention.

As illustrated in FIG. 7, a secondary-side first electrode 211 may be provided on one surface of the secondary-side electronic element 210, and a secondary-side second electrode 212 may be provided on another surface of the secondary-side electronic element 210. The secondary-side first electrode 211 and the secondary-side conductor layer 230 may be connected via a secondary-side first connector and a conductive adhesive such as solder. Furthermore, as illustrated in FIG. 6, the secondary-side first electrode (for example, a source electrode) 211 and the secondary-side second electrode (for example, a gate electrode) 212 may be provided on one surface of the secondary-side electronic element 210, and a secondary-side third electrode (for example, a drain electrode) 213 may be provided on another surface of the secondary-side electronic element 210. The secondary-side third electrode 213 and the secondary-side conductor layer 230 may be connected via a conductive adhesive such as solder.

Figure 8:
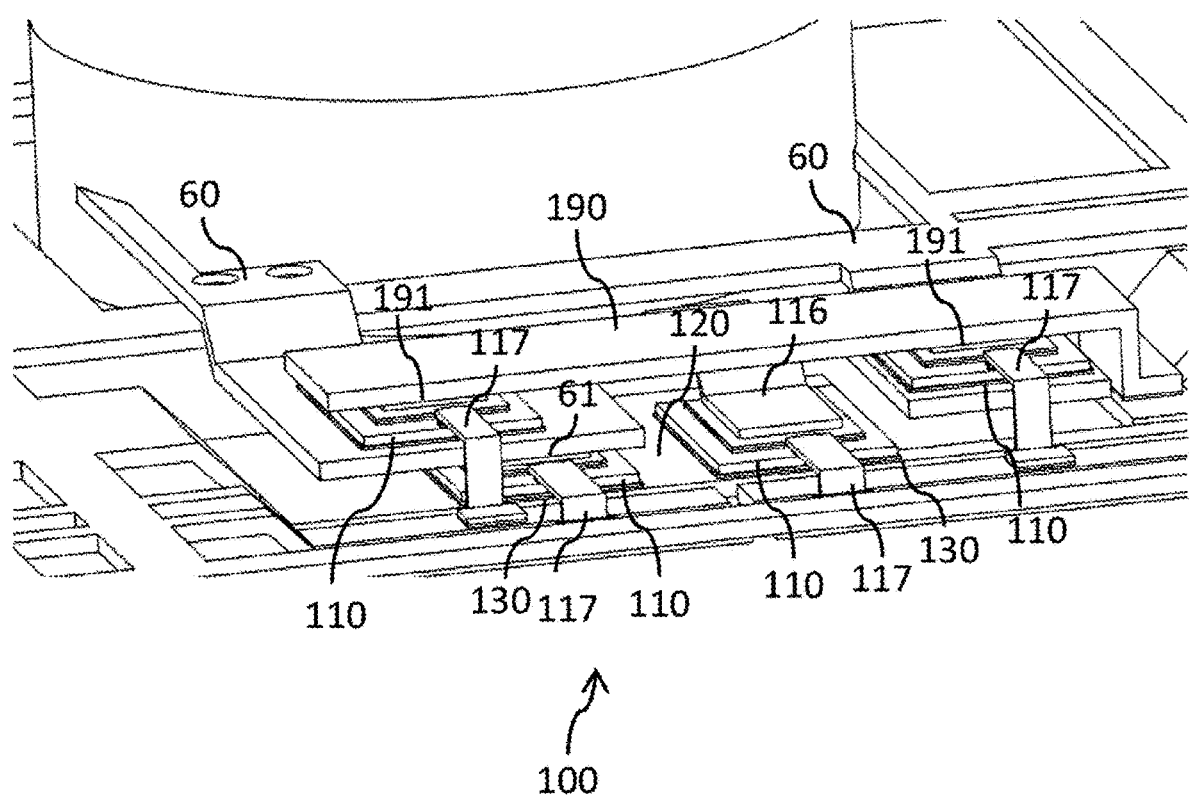
FIG. 8 is a perspective view illustrating an aspect on a side of a first electronic module that can be used in the first embodiment of the present invention.

As illustrated in FIG. 8, a first electronic module 100 may have a primary-side substrate 120, a plurality of primary-side conductor layers 130 that is provided on one surface of the primary-side substrate 120, and a primary-side electronic element 110 that is provided on one surface of the primary-side conductor layer 130. The primary-side electronic element 110, a surface on one side of the primary-side substrate 120, and a surface on the one side of the primary-side conductor layer 130 may be sealed with the primary-side sealing part 150 (see FIG. 3).

Figure 9:
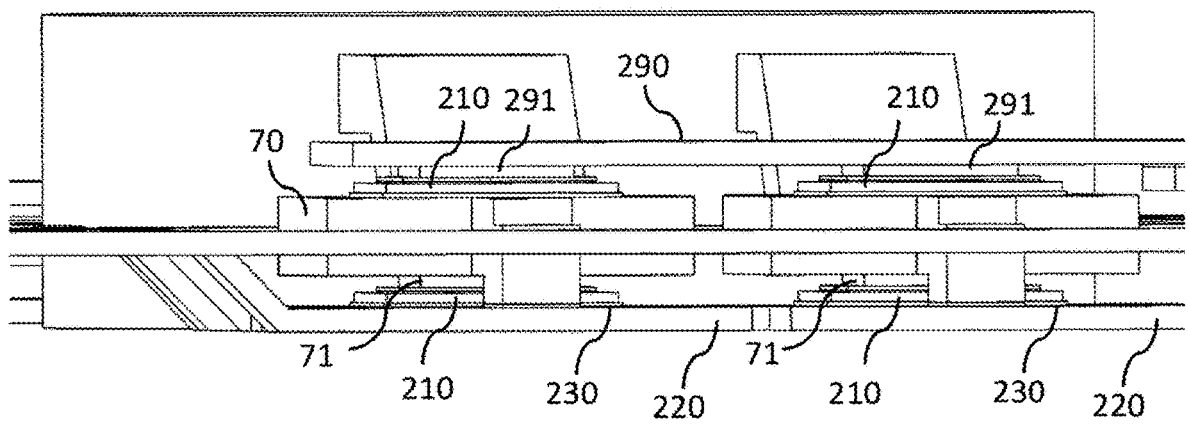
FIG. 9 is a perspective view illustrating an aspect on a side of a second electronic module that can be used in the first embodiment of the present invention.

As illustrated in FIG. 9, a second electronic module 200 may have a secondary-side substrate 220, a plurality of secondary-side conductor layers 230 that is provided on one surface of the secondary-side substrate 220, and a secondary-side electronic element 210 that is provided on one surface of the secondary-side conductor layer 230. The secondary-side electronic element 210, a surface on the one side of the secondary-side substrate 220, and a surface on the one side of the secondary-side conductor layer 230 may be sealed with the secondary-side sealing part 250.

As illustrated as two primary-side electronic elements 110 on a left-hand side in FIG. 8, the primary-side electronic element 110 may be provided on each of the one side and another side of the primary-side extension part 60. As an example, a primary-side first electrode (for example, a source electrode) 111 of a primary-side electronic element 110 that is located on the other side of the primary-side extension part 60 and a primary-side third electrode (for example, a drain electrode) 113 of a primary-side electronic element 110 that is located on the one side of the primary-side extension part 60 may be electrically connected by the primary-side extension part 60.

As illustrated as a primary-side electronic element 110 on a leftmost side and a primary-side electronic element 110 on a rightmost side in FIG. 8, a primary-side connecting body 190 that connects a plurality of primary-side electronic elements 110 that is provided on the one side of the primary-side extension part 60 may be provided. As an example, primary-side first electrodes (for example, source electrodes) 111 of a plurality of primary-side electronic elements 110 that is located on the one side of the primary-side extension part 60 may be electrically connected by the primary-side connecting body 190.

A plurality of primary-side electronic elements 110 may be provided, and from among the plurality of primary-side electronic elements 110, one primary-side electronic element 110 or two or more primary-side electronic elements 110 may be provided on the primary-side extension part 60 via a conductive adhesive such as solder, and the remaining primary-side electronic elements 110 may be provided on the primary-side substrate 120 via a conductive adhesive such as solder. In the aspect illustrated in FIG. 8, a primary-side electronic element 110 on a leftmost side and a primary-side electronic element 110 on a rightmost side are provided on the primary-side extension part 60, and two primary-side electronic elements 110 in the middle are provided on primary-side conductor layers 130 that are provided on the primary-side substrate 120.

As illustrated in FIG. 9, the secondary-side electronic element 210 may be provided on each of the one side and the other side of the secondary-side extension part 70. As an example, a secondary-side first electrode (for example, a source electrode) 211 of a secondary-side electronic element 210 that is located on the other side of the secondary-side extension part 70 and a secondary-side third electrode (for example, a drain electrode) 213 of a secondary-side electronic element 210 that is located on the one side of the secondary-side extension part 70 may be electrically connected by the secondary-side extension part 70. A protrusion part 71 may be provided on the other side of the secondary-side extension part 70, and the protrusion part 71 may be connected to an electrode 211 or 212 of the secondary-side electronic element 210. As illustrated in FIG. 8, the primary-side extension part 60 may also have a protrusion part 61. Then, this protrusion part 61 may be connected to an electrode 111 or 112 of the primary-side electronic element 110.

As illustrated in FIG. 9, a secondary-side connecting body 290 that connects a plurality of secondary-side electronic elements 210 that is provided on the one side of the secondary-side extension part 70 may be provided. As an example, secondary-side first electrodes (for example, source electrodes) 211 of a plurality of secondary-side electronic elements 210 that is located on the one side of the secondary-side extension part 70 may be electrically connected by the secondary-side connecting body 290. A protrusion part 291 may be provided on the other side of the secondary-side connecting body 290, and the protrusion part 291 may be connected to the electrode 211 or 212 of the secondary-side electronic element 210. Furthermore, as illustrated in FIG. 8, a protrusion part 191 may be provided on the other side of the primary-side connecting body 190, and the protrusion part 191 may be connected to the electrode 111 or 112 of the primary-side electronic element 110.

A plurality of secondary-side electronic elements 210 may be provided, and from among the plurality of secondary-side electronic elements 210, one secondary-side electronic element 210 or two or more secondary-side electronic elements 210 may be provided on the secondary-side extension part 70, and the remaining secondary-side electronic elements 210 may be provided on the secondary-side substrate 220. In the aspect illustrated in FIG. 9, two secondary-side electronic elements 210 are provided on the secondary-side extension part 70, and two secondary-side electronic elements 210 are provided on secondary-side conductor layers 230 that are provided on the secondary-side substrate 220.

As illustrated in FIG. 3, the primary coil 10 may have a first coil 10a and a second coil 10b coupled to the first coil 10a. The second coil 10b may be provided on the one side of the first coil 10a, and the first coil 10a and the second coil 10b may be coupled by a connecting part 19 that extends along a first direction and has a linear shape. The connecting part 19 does not need to be completely parallel to the first direction, and may be inclined with respect to the first direction. An aspect of "extending along the first direction" also includes an aspect of extending to be inclined with respect to the first direction, as described above. The secondary coil 20 may be provided on the one side of the second coil 10b.

The first coil 10a and the second coil 10b of the primary coil 10 may have the same number of turns, or may have numbers of turns that are different from each other. As an example, each of the numbers of turns of the first coil 10a and the second coil 10b of the primary coil 10 may be 5. The number of turns of the secondary coil 20 may be 1, or may be 2 or more. The number of turns of the secondary coil 20 may be less than 1, and the secondary coil 20 may have an aspect of not being wound one turn.

Figure 11:
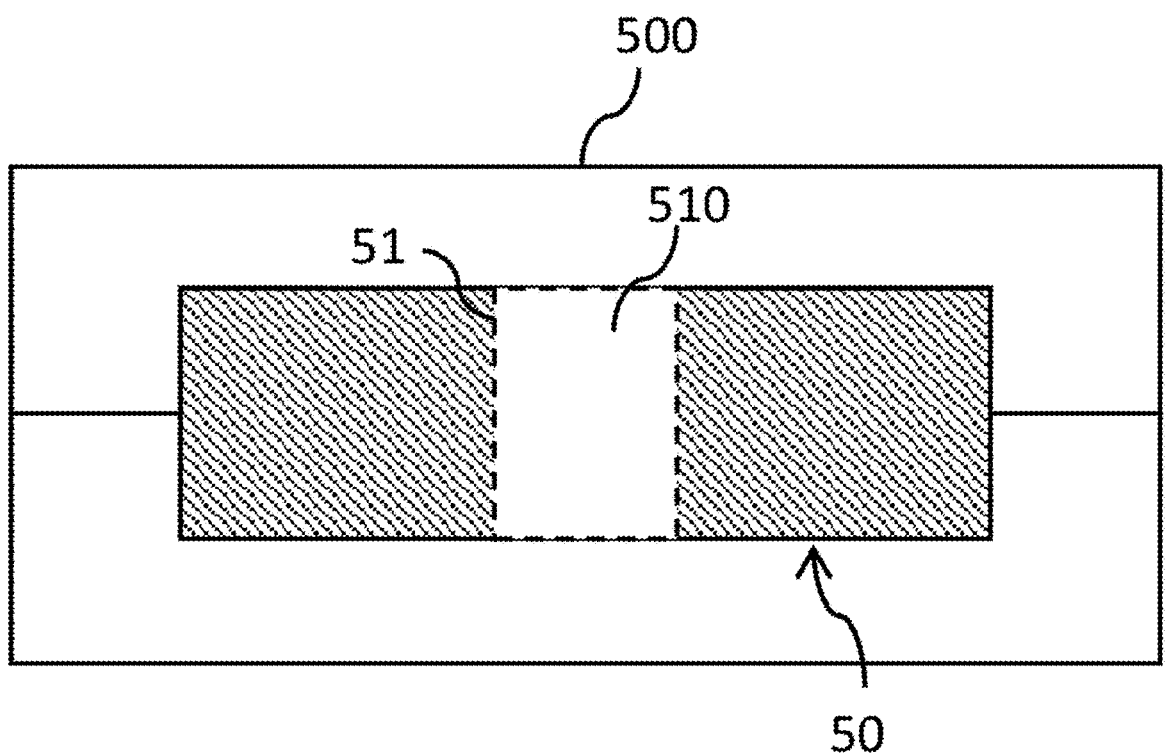
FIG. 11 is a side view illustrating a relationship between the coil sealing part and a core that can be used in the first embodiment of the present invention.

As illustrated in FIG. 11, a core 500 that passes through the primary coil 10 and the secondary coil 20 may be provided. The core 500 may have a leg part 510, and the leg part 510 may be provided to pass through an opening part 51 that is provided in the coil sealing part 50. The leg part 510 of the core 500 may be provided to abut onto an inner peripheral surface of the coil sealing part 50. An outer peripheral part of the core 500 may be provided to cover an outer periphery of the coil sealing part 50.

Effects

Next, an example of operations or effects according to the present embodiment having the configuration described above is described. All of the aspects described in the "Effects" can be employed in the configuration described above.

In the present embodiment, as illustrated in FIG. 1, in a case where an aspect in which the primary-side electronic element 110 is provided on the primary-side extension part 60 that extends from the primary coil 10 to an outside of the coil sealing part 50 has been employed, wiring length can be reduced, and a size of the electronic device can be reduced.

Similarly, in a case where an aspect in which the secondary-side electronic element 210 is provided on the secondary-side extension part 70 that extends from the secondary coil 20 to the outside of the coil sealing part 50 has been employed, wiring length can be reduced, and the size of the electronic device can be reduced.

As shown in FIG. 3, in a case where an aspect in which the coil sealing part 50 sealing the primary coil 10 and the secondary coil 20 and being made of sealing resin is provided has been employed, an insulating sheet that has been conventionally used does not need to be provided, and as a result, a space that is inevitably formed between insulating sheets can be eliminated. Therefore, thermal conductivity can be increased, and heat dissipation can be enhanced.

As illustrated in FIG. 1, in a case where an aspect in which the primary coil 10 and the primary-side extension part 60 that extends to an inside of the primary-side sealing part 150 are integrated has been employed, there is an advantage in which a member in which the primary coil 10 and the primary-side extension part 60 are integrated can be easily manufactured, by forming the primary coil 10 and the primary-side extension part 60 in a member such as a lead frame and removing an unnecessary portion. The primary-side extension part 60 may have a primary-side first extension part 60a, and a primary-side second extension part 60b that is located on the one side relative to the primary-side first extension part 60a. In the aspect illustrated in FIG. 4, the first coil 10a of the primary coil 10 and the primary-side first extension part 60a are constituted of a lead frame, and a member in which the first coil 10a and the primary-side first extension part 60a are integrated can be formed by removing an outer frame of the lead frame. The second coil 10b of the primary coil 10 and the primary-side second extension part 60b that is provided on the one side relative to the primary-side first extension part 60a may be constituted of a lead frame. In this case, by removing an outer frame of the lead frame, a member in which the second coil 10b and the primary-side second extension part 60b are integrated can be formed.

In a case where an aspect in which the secondary coil 20 and the secondary-side extension part 70 extending to the inside of the secondary-side sealing part 250 are integrated has been employed, a member in which a next coil and the secondary-side extension part 70 are integrated can be easily manufactured, by forming the secondary coil 20 and the secondary-side extension part 70 in a member such as a lead frame and removing an unnecessary portion.

Figure 10:
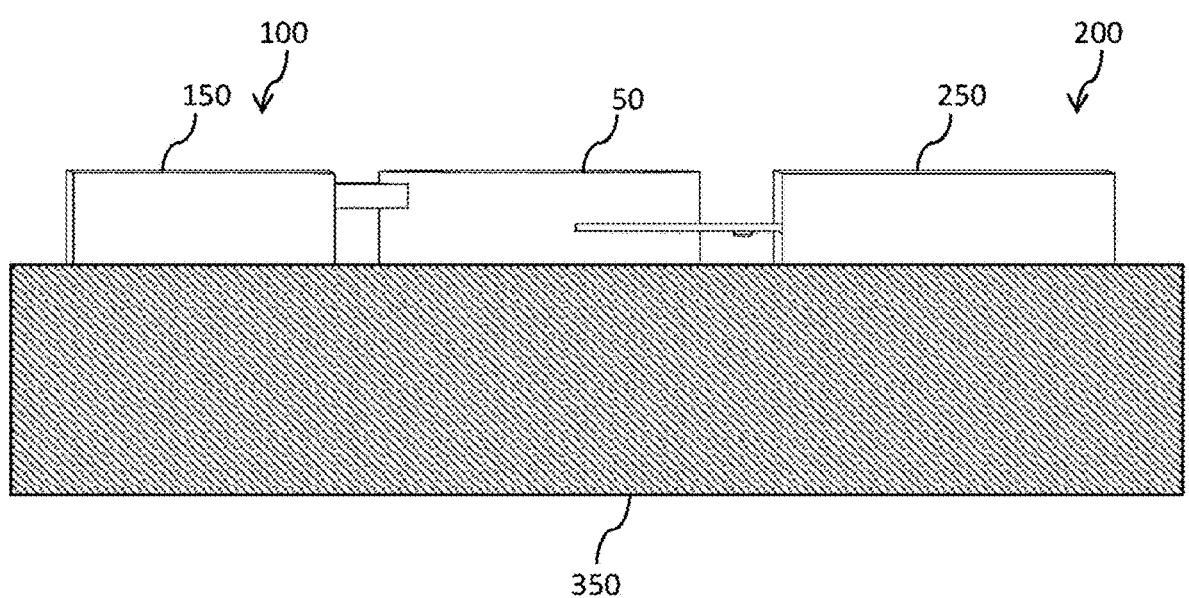
FIG. 10 is a side view illustrating a relationship between the coil sealing part, the primary-side sealing part, and the secondary-side sealing part, and a cooling body that can be used in the first embodiment of the present invention.

As illustrated in FIG. 10, a cooling body 350 such as a heat sink may be provided on another surface (a back surface) of the coil sealing part 50, another surface (a back surface) of the primary-side sealing part 150, and another surface (a back surface) of the secondary-side sealing part 250. In a case where such an aspect has been employed, there is an advantage in which the coil sealing part 50, the primary-side sealing part 150, and the secondary-side sealing part 250 can be cooled down by the cooling body 350.

Second Embodiment

Next, a second embodiment of the present invention is described.

Figure 12:
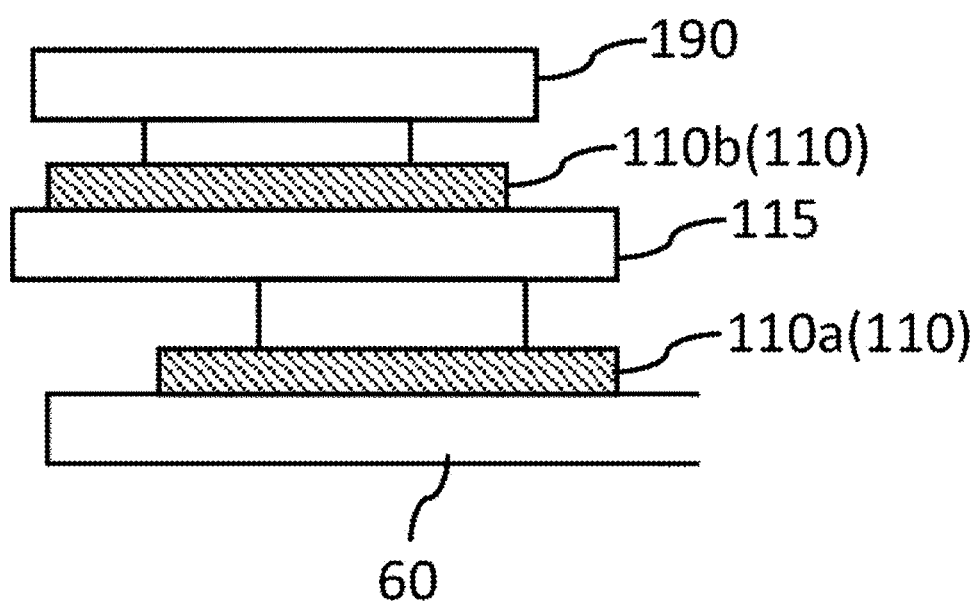
FIG. 12 is a side view illustrating a primary-side electronic element and a primary-side connecting body that can be used in a second embodiment of the present invention.

In the present embodiment, as illustrated in FIG. 12, an aspect in which the primary-side electronic element 110 has a primary-side first electronic element 110a, a primary-side connecting body 115 that is provided on the primary-side first electronic element 110a, and a primary-side second electronic element 110b that is provided on the primary-side connecting body 115 is employed. The other configuration is similar to a configuration in the first embodiment, and all of the aspects described in the first embodiment can be employed. The members described in the first embodiment are described by using the same reference signs.

The primary-side first electronic element 110a of the primary-side electronic element 110 may be provided on the primary-side extension part 60 via a conductive adhesive such as solder. The conductive adhesive such as solder may also be provided between the primary-side first electronic element 110a and the primary-side connecting body 115 and between the primary-side connecting body 115 and the primary-side second electronic element 110b.

In the present embodiment, the primary-side electronic element 110 may only be provided on the one side of the primary-side extension part 60 (See a primary-side electronic element 110 on a rightmost side in FIG. 8. This primary-side electronic element 110 changes to an aspect having the primary-side first electronic element 110a, the primary-side connecting body 115, and the primary-side second electronic element 110b.). However, such an aspect is not restrictive, and the primary-side electronic element 110 may only be provided on the other side of the primary-side extension part 60. Furthermore, the primary-side electronic element 110 may be provided on both the one side and the other side of the primary-side extension part 60 (See two primary-side electronic elements 110 on a left-hand side in FIG. 8. Each of these two primary-side electronic elements 110 changes to an aspect having the primary-side first electronic element 110a, the primary-side connecting body 115, and the primary-side second electronic element 110b.).

Third Embodiment

Next, a third embodiment of the present invention is described.

Figure 13:
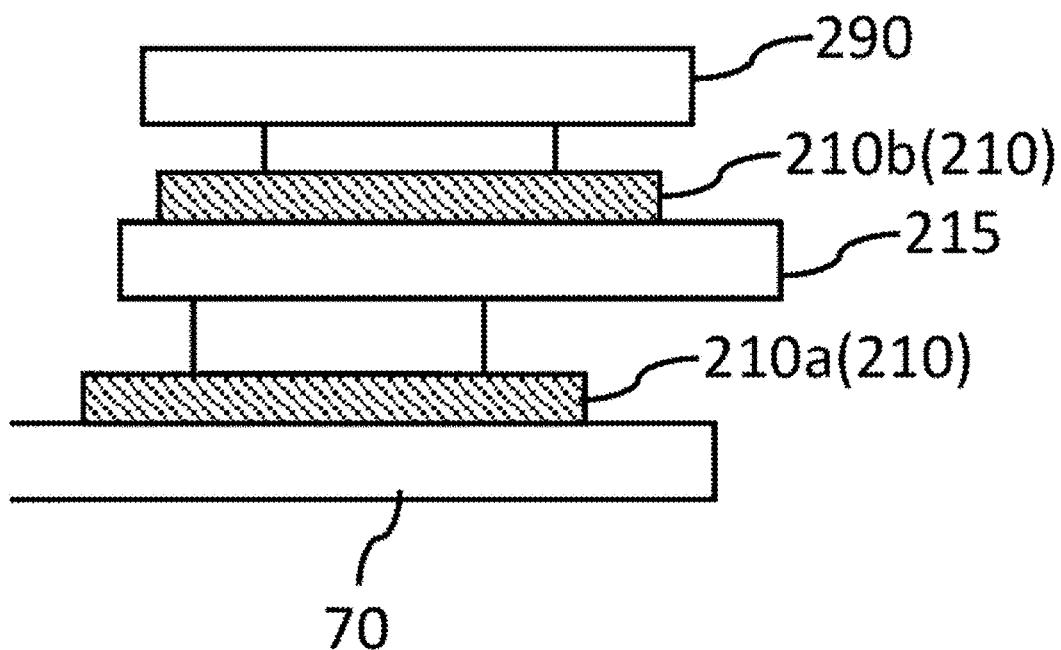
FIG. 13 is a side view illustrating a secondary-side electronic element and a secondary-side connecting body that can be used in a third embodiment of the present invention.

In the present embodiment, as illustrated in FIG. 13, an aspect in which the secondary-side electronic element 210 has a secondary-side first electronic element 210a, a secondary-side connecting body 215 that is provided on the secondary-side first electronic element 210a, and a secondary-side second electronic element 210b that is provided on the secondary-side connecting body 215 is employed. The other configuration is similar to a configuration in the first embodiment or the second embodiment, and all of the aspects described in each of the embodiments described above can be employed. The members described in each of the embodiments described above are described by using the same reference signs.

The secondary-side first electronic element 210a of the secondary-side electronic element 210 may be provided on the secondary-side extension part 70 via a conductive adhesive such as solder. The conductive adhesive such as solder may also be provided between the secondary-side first electronic element 210a and the secondary-side connecting body 215 and between the secondary-side connecting body 215 and the secondary-side second electronic element 210b.

In the present embodiment, the secondary-side electronic element 210 may only be provided on the one side of the secondary-side extension part 70. However, such an aspect is not restrictive, and the secondary-side electronic element 210 may only be provided on the other side of the secondary-side extension part 70. Furthermore, the primary-side electronic element 110 may be provided on both the one side and the other side of the primary-side extension part 60 (See two secondary-side electronic elements 210 on a left-hand or right-hand side in FIG. 9. Each of these two secondary-side electronic elements 110 changes to an aspect having the secondary-side first electronic element 210a, the secondary-side connecting body 215, and the secondary-side second electronic element 210b.).

Fourth Embodiment

Next, a fourth embodiment of the present invention is described.

Figure 14:
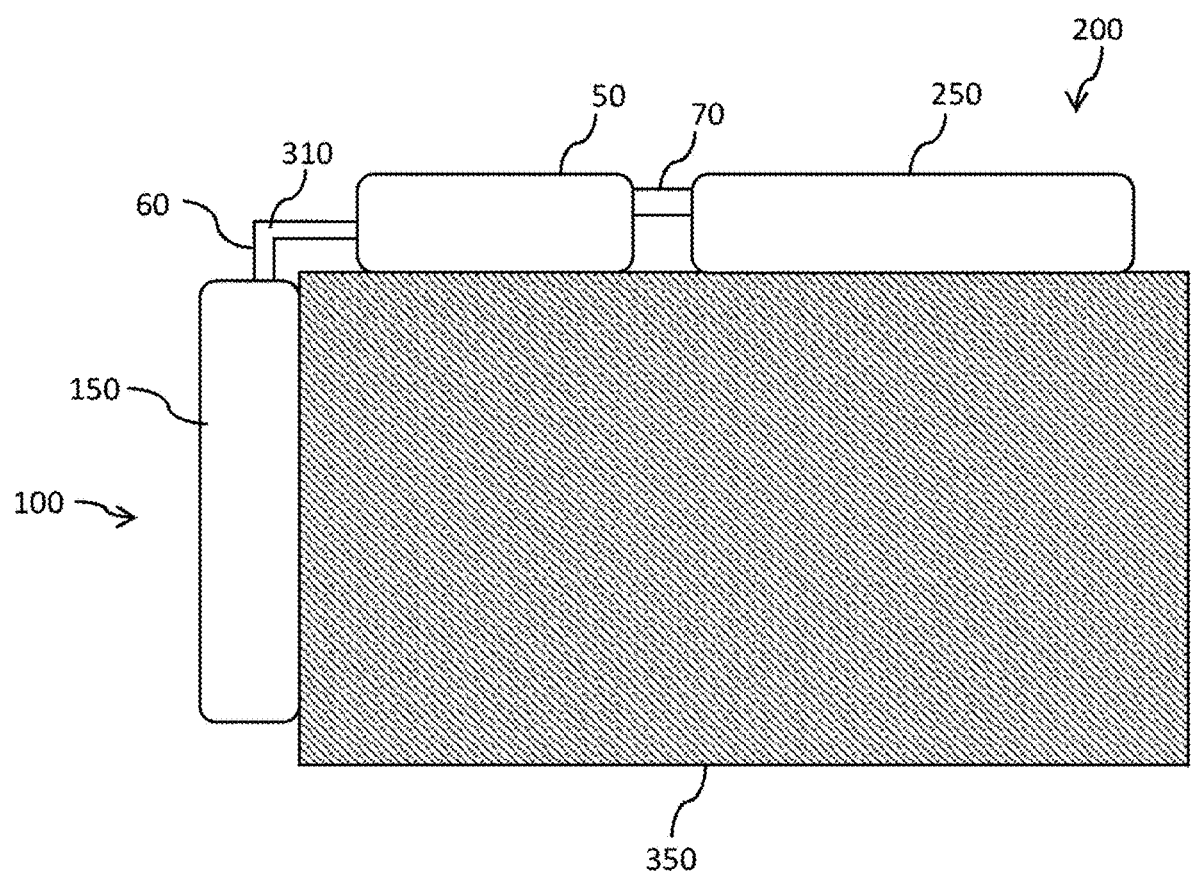
FIG. 14 is a side view illustrating a relationship between a coil sealing part, a primary-side sealing part, and a secondary-side sealing part, and a cooling body that can be used in a fourth embodiment of the present invention.

As illustrated in FIG. 14, in the present embodiment, an aspect in which a first bent part 310 is provided in the primary-side extension part 60 between the coil sealing part 50 and the primary-side sealing part 150 is employed. The other configuration is similar to a configuration in the first embodiment to the third embodiment, and all of the aspects described in each of embodiments can be employed. The members described in each of embodiments are described by using the same reference signs.

According to the present embodiment, the coil sealing part 50 and the secondary-side sealing part 250 can be disposed along a plane direction, and the primary-side sealing part 150 can be disposed along a direction that is bent by a predetermined angle (for example, 60 degrees, 90 degrees, 120 degrees, or the like) with respect to the plane direction. Therefore, a size in a certain plane direction can be reduced.

Furthermore, such bending enables a reduction in an influence of noise or the like generated in the primary-side electronic element 110 sealed with the primary-side sealing part 150 on the secondary-side electronic element 210 sealed with the secondary-side sealing part 250, and also enables a reduction in an influence of noise or the like generated in the secondary-side electronic element 210 on the secondary-side electronic element 210 sealed with the primary-side sealing part 150.

In the present embodiment, similarly, the cooling body 350 such as a heat sink may be provided on the back surface of the coil sealing part 50, the back surface of the primary-side sealing part 150, and the back surface of the secondary-side sealing part 250. In a case where such an aspect has been employed, there is an advantage in which the coil sealing part 50, the primary-side sealing part 150, and the secondary-side sealing part 250 can be cooled down by the cooling body 350.

Fifth Embodiment

Next, a fifth embodiment of the present invention is described.

Figure 15:
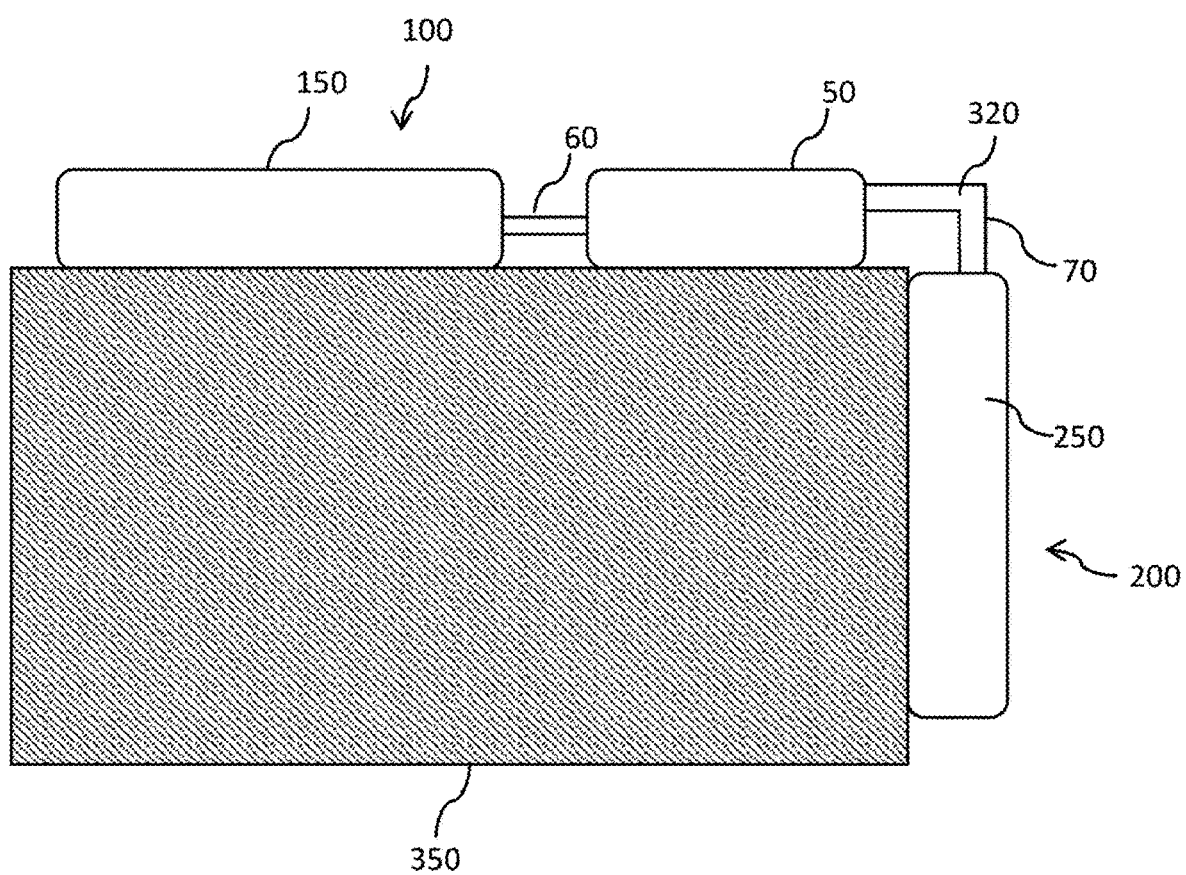
FIG. 15 is a side view illustrating a relationship between a coil sealing part, a primary-side sealing part, and a secondary-side sealing part, and a cooling body that can be used in a fifth embodiment of the present invention.

As illustrated in FIG. 15, in the present embodiment, an aspect in which a second bent part 320 is provided in the secondary-side extension part 70 between the coil sealing part 50 and the secondary-side sealing part 250 is employed. The other configuration is similar to a configuration in the first embodiment to the third embodiment, and all of the aspects described in each of the embodiments can be employed. The members described in each of the embodiments are described by using the same reference signs.

According to the present aspect, the coil sealing part 50 and the primary-side sealing part 150 can be disposed along a plane direction, and the secondary-side sealing part 250 can be disposed along a direction that is bent by a predetermined angle (for example, 60 degrees, 90 degrees, 120 degrees, or the like) with respect to the plane direction. Therefore, a size in a certain plane direction can be reduced.

Furthermore, such bending enables a reduction in an influence of noise or the like generated in the primary-side electronic element 110 sealed with the primary-side sealing part 150 on the secondary-side electronic element 210 sealed with the secondary-side sealing part 250, and also enables a reduction in an influence of noise or the like generated in the secondary-side electronic element 210 on the secondary-side electronic element 210 sealed with the primary-side sealing part 150.

In the present embodiment, similarly, the cooling body 350 such as a heat sink may be provided on the back surface of the coil sealing part 50, the back surface of the primary-side sealing part 150, and the back surface of the secondary-side sealing part 250. In a case where such an aspect has been employed, there is an advantage in which the coil sealing part 50, the primary-side sealing part 150, and the secondary-side sealing part 250 can be cooled down by the cooling body 350.

Sixth Embodiment

Next, a sixth embodiment of the present invention is described.

Figure 16:
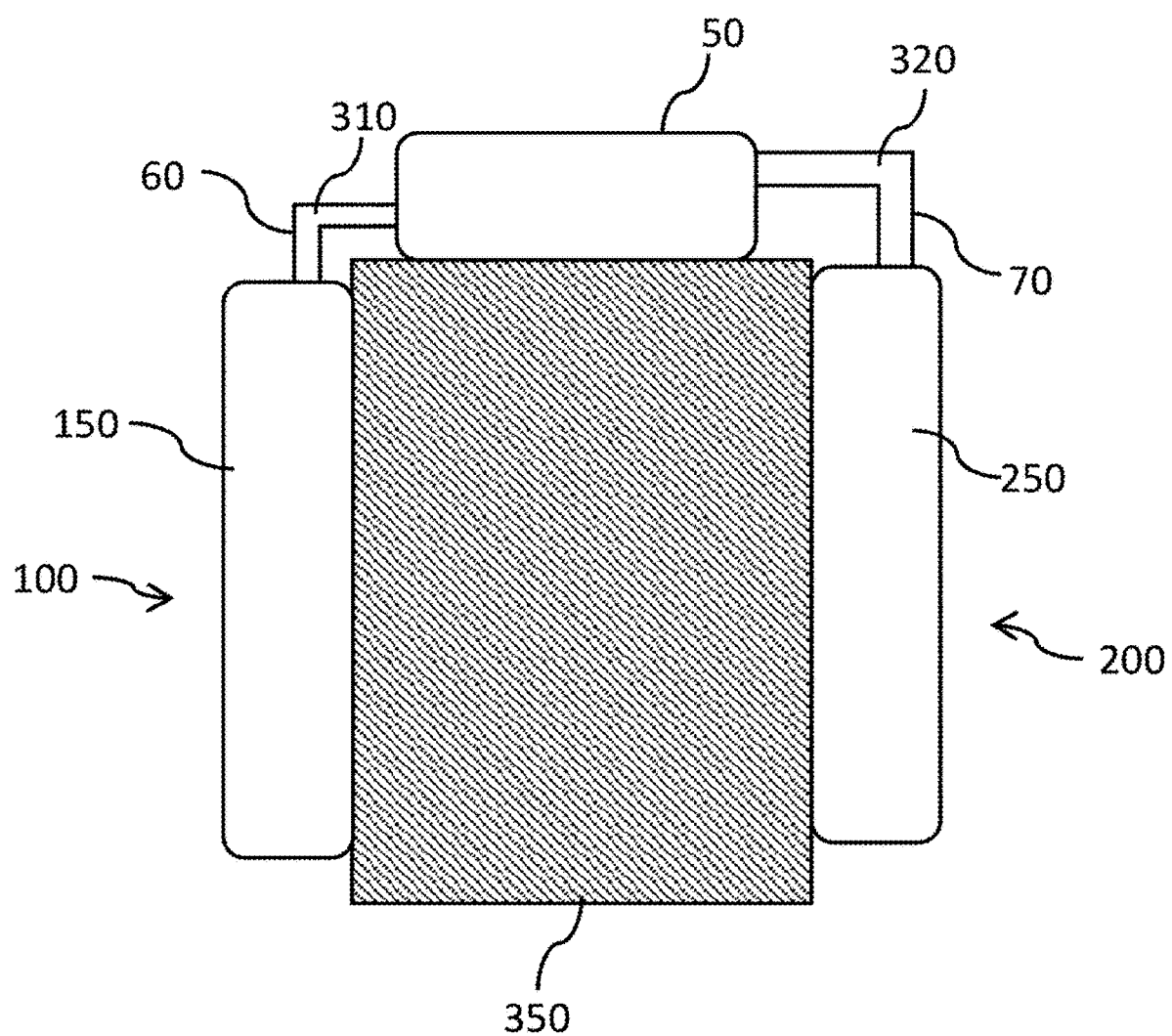
FIG. 16 is a side view illustrating a relationship between a coil sealing part, a primary-side sealing part, and a secondary-side sealing part, and a cooling body that can be used in a sixth embodiment of the present invention.

As illustrated in FIG. 16, in the present embodiment, an aspect in which the first bent part 310 is provided in the primary-side extension part 60 between the coil sealing part 50 and the primary-side sealing part 150 and the second bent part 320 is provided in the secondary-side extension part 70 between the coil sealing part 50 and the secondary-side sealing part 250 is employed. The other configuration is similar to a configuration in the first embodiment to the third embodiment, and all of the aspects described in each of embodiments can be employed. The members described in each of embodiments are described by using the same reference signs.

According to the present embodiment, the coil sealing part 50, the primary-side sealing part 150, and the secondary-side sealing part 250 can be respectively disposed along plane directions that are different from each other. Furthermore, the primary-side sealing part 150 and the secondary-side sealing part 250 can also be disposed in such a way that respective back surfaces face each other. The coil sealing part 50 and the primary-side sealing part 150 may be disposed to be bent by a first angle (for example, 60 degrees, 90 degrees, 120 degrees, or the like) with respect to each other, and the coil sealing part 50 and the secondary-side sealing part 250 may be disposed to be bent by a second angle (for example, 60 degrees, 90 degrees, 120 degrees, or the like) with respect to each other.

In the present embodiment, similarly, the cooling body 350 such as a heat sink may be provided on the back surface of the coil sealing part 50, the back surface of the primary-side sealing part 150, and the back surface of the secondary-side sealing part 250. In a case where such an aspect has been employed, there is an advantage in which the coil sealing part 50, the primary-side sealing part 150, and the secondary-side sealing part 250 can be cooled down by the cooling body 350. As an example, in a case where, for example, an aspect in which the coil sealing part 50 and the primary-side sealing part 150 are disposed to be bent by 90 degrees with respect to each other and the coil sealing part 50 and the secondary-side sealing part 250 are disposed to be bent by 90 degrees with respect to each other has been employed, disposition can be performed in such a way that the back surface of the coil sealing part 50, the back surface of the primary-side sealing part 150, and the back surface of the secondary-side sealing part 250 respectively abut onto three surfaces of the cooling body 350 that is made of a heat sink or the like, and there is an advantage in which a high cooling effect can be expected.

Figure 17:
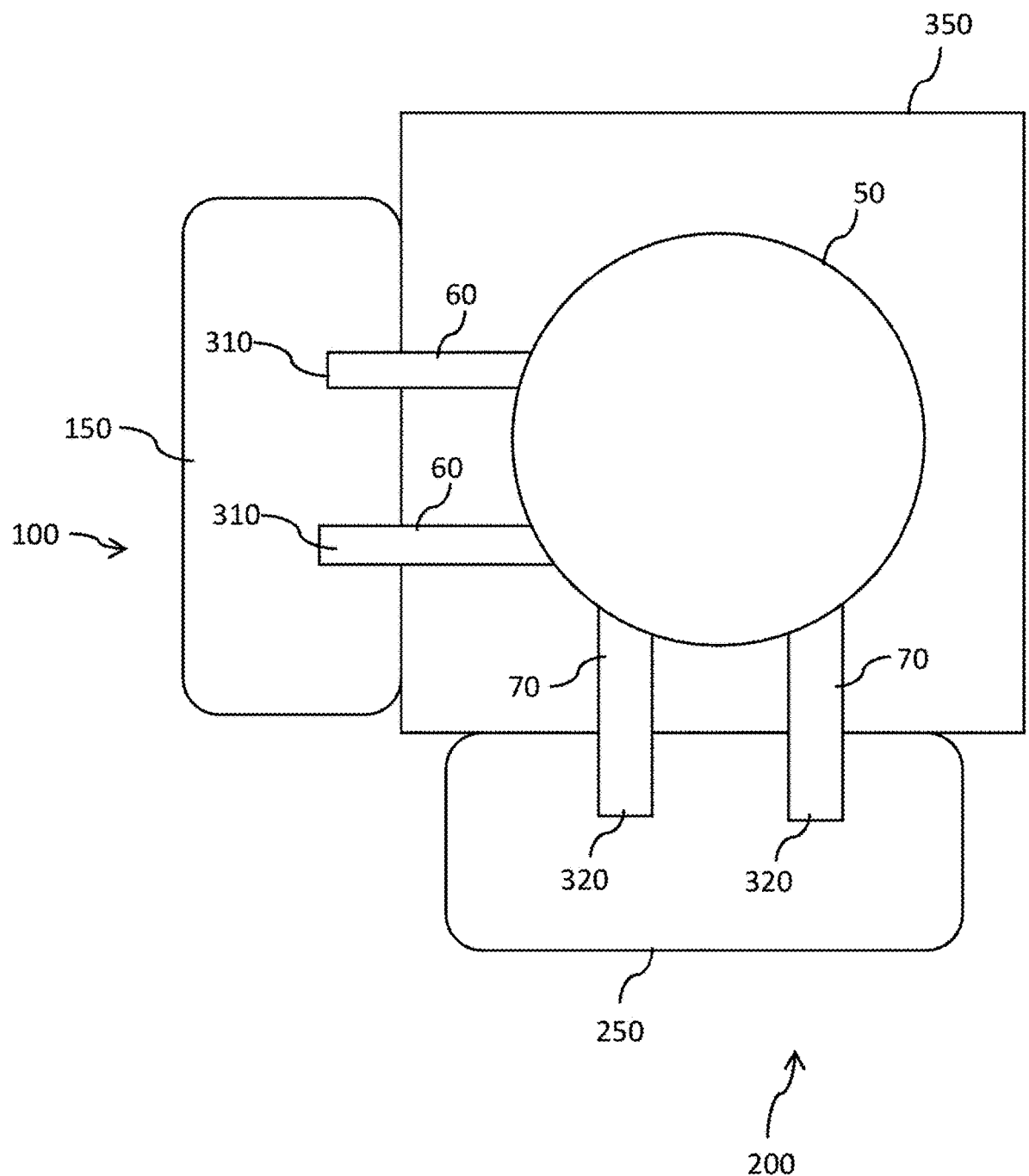
FIG. 17 is a plan view illustrating an example of a disposition aspect of a primary-side sealing part and a secondary-side sealing part that can be used in an embodiment of the present invention.

The primary-side terminal 60 and the secondary-side terminal 70 do not need to be provided linearly. For example, the primary-side terminal 60 and the secondary-side terminal 70 may be provided to be orthogonal to each other in a plane direction, or may be provided to cross each other at an angle that is different from 90 degrees in the plane direction. FIG. 17 illustrates an aspect in which the primary-side terminal 60 and the secondary-side terminal 70 are orthogonal to each other in the plane direction. As described above, according to the present embodiment, the primary-side sealing part 150 and the secondary-side sealing part 250 can be disposed in any direction of the plane direction, and can be bent by using the first bent part 310 and the second bent part 320.

The description of each embodiment and the disclosure of the figures described above are merely examples for explaining the invention described in the claims, and the invention described in the claims is not limited by the description of the embodiment or the disclosure of the figures described above. In addition, the recitation of the claims at the original application is merely an example, and the description of the claims can be appropriately changed based on the description of the specification, the figures, and the like.

REFERENCE SIGNS LIST

10 Primary coil
10a First coil
10b Second coil
20 Secondary coil
50 Coil sealing part
60 Primary-side extension part
70 Secondary-side extension part
110 Primary-side electronic element
110a Primary-side first electronic element
110b Primary-side second electronic element
115 Primary-side connecting body
210 Secondary-side electronic element
210a Secondary-side first electronic element
210b Secondary-side second electronic element
215 Secondary-side connecting body
310 First bent part
320 Second bent part
350 Cooling body

What is claimed is:

1. An electronic device comprising:
   a primary coil;
   a secondary coil disposed to face the primary coil;
   a coil sealing part sealing the primary coil and the secondary coil and being made of sealing resin;
   a primary-side electronic element electrically connected to the primary coil;
   a secondary-side electronic element electrically connected to the secondary coil;
   a primary-side extension part integrated with the primary coil and extending from the primary coil to an outside of the coil sealing part; and
   a secondary-side extension part integrated with the secondary coil and extending from the secondary coil to the outside of the coil sealing part,
   wherein entire footprint of the primary-side electronic element is provided on a surface of the primary-side extension part via a conductive adhesive, and entire footprint of the secondary-side electronic element is provided on a surface of the secondary-side extension part via a conductive adhesive.

2. The electronic device according to claim 1, wherein the primary-side electronic element has a primary-side first electronic element, a primary-side connecting body provided on the primary-side first electronic element, and a primary-side second electronic element provided on the primary-side connecting body.

3. The electronic device according to claim 1, wherein the secondary-side electronic element has a secondary-side first electronic element, a secondary-side connecting body provided on the secondary-side first electronic element, and a secondary-side second electronic element provided on the secondary-side connecting body.

4. The electronic device according to claim 1, wherein the primary coil has a first coil and a second coil coupled to the first coil.

5. The electronic device according to claim 4, wherein the primary coil is made from a lead frame.

6. The electronic device according to claim 1, wherein
a first bent part is provided between the coil sealing part and the primary-side electronic element, and in the primary-side extension part.

7. The electronic device according to claim 1, wherein
a second bent part is provided between the coil sealing part and the secondary-side electronic element, and in the secondary-side extension part.

8. The electronic device according to claim 1,
wherein a first bent part is provided between the coil sealing part and the primary-side electronic element, and in the primary-side extension part,
wherein a second bent part is provided between the coil sealing part and the secondary-side electronic element, and in the secondary-side extension part,
wherein a primary-side sealing part sealing the primary-side electronic element is provided,
wherein a secondary-side sealing part sealing the secondary-side electronic element is provided, and
wherein a back surface of the coil sealing part, a back surface of the primary-side sealing part, and a back surface of the secondary-side sealing part is able to abut onto a cooling body.

* * * * *